United States Patent
Grajales et al.

(10) Patent No.: US 12,140,324 B2
(45) Date of Patent: Nov. 12, 2024

(54) FAN UNIT FOR AN HVAC SYSTEM

(71) Applicant: Johnson Controls Tyco IP Holdings LLP, Milwaukee, WI (US)

(72) Inventors: Hector Iovan Grajales, Oklahoma City, OK (US); Anthony J. Reardon, Norman, OK (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/230,063

(22) Filed: Aug. 3, 2023

(65) Prior Publication Data
US 2024/0044523 A1   Feb. 8, 2024

Related U.S. Application Data

(60) Provisional application No. 63/394,939, filed on Aug. 3, 2022.

(51) Int. Cl.
*F24F 1/0018* (2019.01)
*B60H 1/00* (2006.01)
(Continued)

(52) U.S. Cl.
CPC ........ *F24F 1/0018* (2013.01); *B60H 1/00857* (2013.01); *B60H 1/00871* (2013.01);
(Continued)

(58) Field of Classification Search
CPC combination set(s) only.
See application file for complete search history.

(56) References Cited

U.S. PATENT DOCUMENTS 4,449,376 A * 5/1984 Draper .................... F25B 39/00
62/448
4,712,611 A * 12/1987 Witzel ............... B60H 1/00471
165/DIG. 309
(Continued)

FOREIGN PATENT DOCUMENTS

CN   109441887 A   3/2019
EP      2108897 A   10/2009

OTHER PUBLICATIONS

Howtodoit, Air-Handler Fan Cleaning and Maintenance, Youtube—6:25 minutes, May 15, 2019, 3 pgs., https://www.youtube.com/watch?v=4cydNuaY2ml.
(Continued)

*Primary Examiner* — Binh Q Tran
(74) *Attorney, Agent, or Firm* — Fletcher Yoder, PC

(57) ABSTRACT

A heating, ventilation, and/or air conditioning (HVAC) blower assembly includes a motor and a fan wheel, wherein the motor drives rotation of the fan wheel about an axis of rotation. A blower housing accommodates the fan wheel within a hollow portion and is defined by a base, a curved boundary, a front boundary, and a rear boundary. An inlet port extending through the front boundary facilitates intake of airflow into the fan wheel. An outlet port extending through the base facilitates expulsion of the airflow from the fan wheel. A first portion of the curved boundary includes an involute profile and a second portion of the curved boundary includes a footing extending from the first portion to the base such that airflow exiting through the outlet port is guided away from the fan wheel by an interior-facing surface of the footing.

20 Claims, 10 Drawing Sheets

(51) Int. Cl.

| | |
|---|---|
| *F24F 1/0007* | (2019.01) |
| *F24F 1/0033* | (2019.01) |
| *F24F 1/0043* | (2019.01) |
| *F24F 1/0067* | (2019.01) |
| *F24F 1/0068* | (2019.01) |
| *F24F 1/028* | (2019.01) |
| *F24F 1/029* | (2019.01) |
| *F24F 1/38* | (2011.01) |
| *F24F 1/48* | (2011.01) |
| *F24F 13/08* | (2006.01) |
| *F24F 13/20* | (2006.01) |

(52) U.S. Cl.
CPC ......... *F24F 1/00073* (2019.02); *F24F 1/0033* (2013.01); *F24F 1/0043* (2019.02); *F24F 1/0067* (2019.02); *F24F 1/0068* (2019.02); *F24F 1/028* (2019.02); *F24F 1/029* (2019.02); *F24F 1/38* (2013.01); *F24F 1/48* (2013.01); *F24F 13/08* (2013.01); *F24F 13/081* (2013.01); *F24F 2013/202* (2013.01); *F24F 2013/205* (2013.01)

(56) References Cited

U.S. PATENT DOCUMENTS

| | | | | |
|---|---|---|---|---|
| 5,531,267 A * | 7/1996 | Ahmed | ................. | F04D 29/582 415/203 |
| 7,108,478 B2 | 9/2006 | Hancock | | |
| 9,261,108 B2 | 2/2016 | Van Deventer | | |
| 9,759,446 B2 | 9/2017 | Stewart et al. | | |
| 10,006,661 B2 | 6/2018 | Hanks et al. | | |
| 11,236,762 B2 * | 2/2022 | Jayarathne | .......... | F04D 29/4226 |
| 2004/0253101 A1 * | 12/2004 | Hancock | ................ | F04D 29/626 415/213.1 |
| 2010/0226766 A1 * | 9/2010 | Eguchi | .................. | F04D 29/422 415/206 |
| 2012/0276836 A1 | 11/2012 | Stewart et al. | | |
| 2014/0056695 A1 | 2/2014 | Locker, Jr. et al. | | |
| 2019/0212031 A1 | 7/2019 | Stewart et al. | | |
| 2019/0316597 A1 * | 10/2019 | Brendel | ................ | F04D 29/30 |
| 2022/0178385 A1 | 6/2022 | Jayarathne et al. | | |

OTHER PUBLICATIONS

Anti DIY HVAC, Replacing X-13 Blower Motor in ICP Air Handler, YouTube—24:05 minutes, Sep. 24, 2019, 3 pgs., https://www.youtube.com/watch?v=-55iLKHEDOk.

Tomahawk DIY, How to Remove and Clean a Furnace Blower Wheel, YouTube—5:37 minutes, Sep. 29, 2015, 3 pgs., https://www.youtube.com/watch?v=MODlBXCGuRE.

12Voltvids, Carrier HVAC System Blower Fan Repair, YouTube—19:03 minutes, May 17, 2018, 4 pgs., https://www.youtube.com/watch?v=MfJRfRBTd_4.

RepairClinic.com, Payne Furnace Blower Motor Replacement #HC43AE134, YouTube—9:10 minutes, Mar. 11, 2015, 3 pgs.,https://www.youtube.com/watch?v=vuwOb3c5bik&list=RDCMUCGIWoFCiw_H5SW4sHWFzQSw&start_radio=1.

* cited by examiner

FAN UNIT FOR AN HVAC SYSTEM

CROSS-REFERENCE TO RELATED APPLICATIONS

This application claims priority from and the benefit of U.S. Provisional Application Ser. No. 63/394,939, entitled "A FAN UNIT FOR AN HVAC SYSTEM," filed Aug. 3, 2022, which is herein incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are utilized in residential, commercial, and industrial environments to control environmental properties, such as temperature, humidity, and/or air quality, for occupants of the respective environments. The HVAC system may regulate the environmental properties through delivery of a conditioned air flow to the environment.

An HVAC system generally includes a fan (also referred to as a fan unit, fan system, blower, blower unit, or blower system) that is operable to direct an air flow across one or more heat exchange components of the HVAC system. As such, the fan or blower may facilitate transfer of thermal energy between the heat exchange components and the air flow directed over them to generate the conditioned air flow for delivery to a suitable space within a building or other structure serviced by the HVAC system.

It is now recognized that conventional fans (fan units) possess certain limitations. For example, a traditional fan may be difficult to mount (e.g., within an air handling unit or AHU). Further, it may be arduous and cumbersome to access traditional fans for maintenance, inspection, or other purposes.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a heating, ventilation, and/or air conditioning (HVAC) blower assembly includes a motor and a fan wheel, wherein the motor drives rotation of the fan wheel about an axis of rotation. A blower housing accommodates the fan wheel within a hollow portion and is defined by a base, a curved boundary, a front boundary, and a rear boundary. An inlet port extending through the front boundary facilitates intake of airflow into the fan wheel. An outlet port extending through the base facilitates expulsion of the airflow from the fan wheel. A first portion of the curved boundary includes an involute profile and a second portion of the curved boundary includes a footing extending from the first portion to the base such that airflow exiting through the outlet port is guided away from the fan wheel by an interior-facing surface of the footing. Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

In an embodiment, a heating, ventilation, and/or air conditioning (HVAC) blower assembly includes a fan. The fan includes a motor and a fan wheel, wherein the motor is configured to receive electricity via electrical connectors and to drive rotation of the fan wheel about an axis of rotation. A blower housing accommodates the fan wheel within a hollow portion of the blower housing, wherein the blower housing is defined by a base, a curved boundary, a front boundary, and a rear boundary. An inlet port extending through the front boundary facilitates intake of airflow into the fan wheel. An outlet port extending through the base facilitates expulsion of the airflow from the fan wheel. An access port in the rear boundary receives the fan into the hollow portion. A guide bracket includes a middle portion extending between a first bracket and a second bracket, wherein the guide bracket couples with the rear boundary via the first flange and couples to the motor via the second flange such that the fan is held by the guide bracket within the hollow portion and wiring coupled to the electrical connectors extends along the middle portion and is blocked from contacting the fan wheel.

In an embodiment, a method of supporting a fan within a blower housing includes coupling with a rear boundary of a blower housing via a first flange of a guide bracket. The first flange is coupled to a second flange of the guide bracket via a middle portion of the guide bracket that is in the form of a segment of a frustum of a cone, wherein the guide bracket is formed from a single piece of stamped sheet metal. The method further includes coupling with a motor of a fan via the second flange such that the middle portion extends into an access port of the blower housing and the fan is held within a hollow portion of the blower housing by the guide bracket. Additionally, the method includes guiding wiring along the middle portion, wherein the wiring is coupled to electrical connectors of the motor, and blocking, via the guide bracket, the wiring from contacting the fan wheel.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
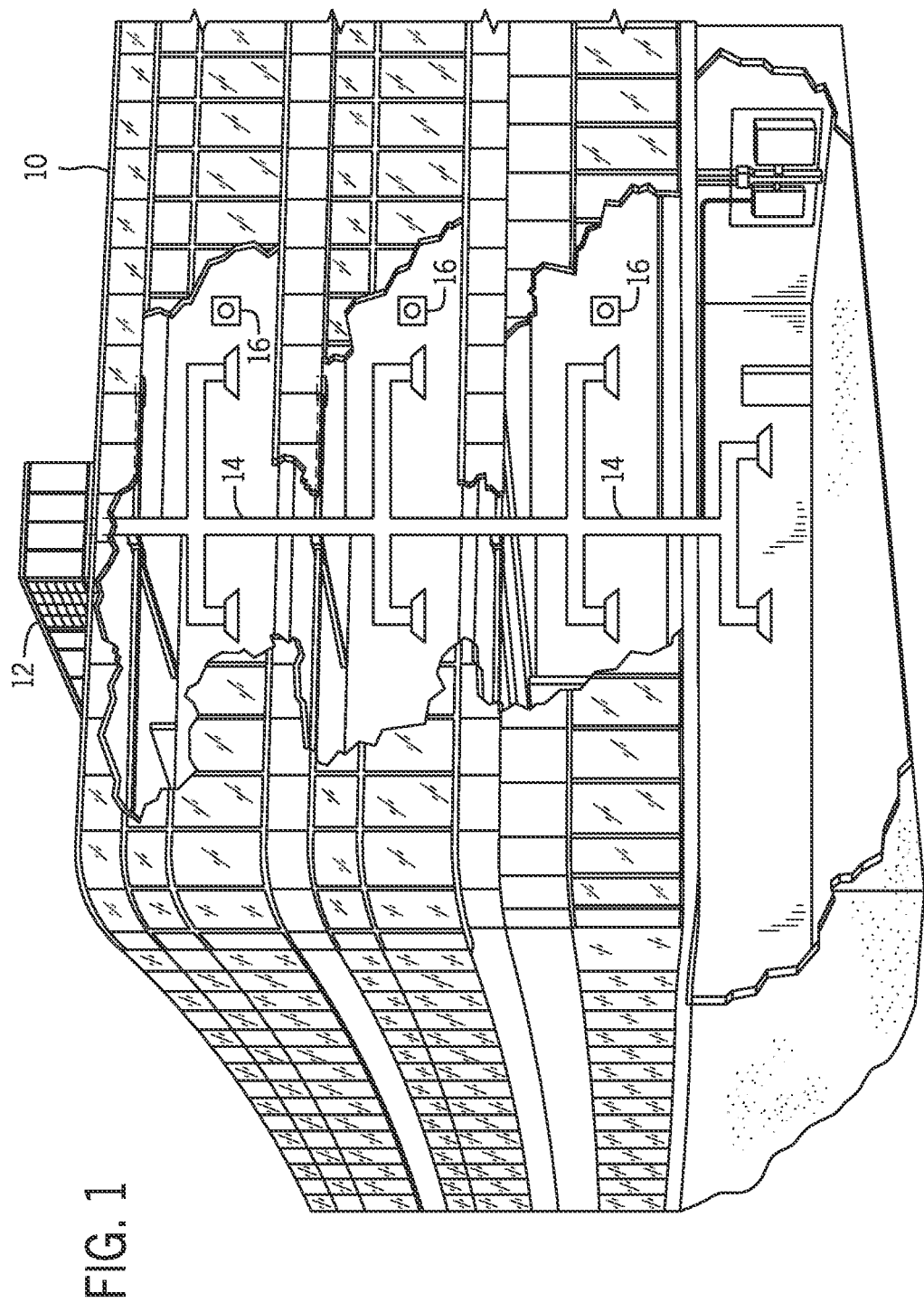
FIG. 1 is a perspective view of an embodiment of a building incorporating a heating, ventilation, and/or air conditioning (HVAC) system in accordance with an aspect of the present disclosure.

The present disclosure relates generally to heating, ventilation, and/or air conditioning (HVAC) systems for a building and air handling units (AHUs) in a building HVAC system.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "approximately," "generally," and "substantially," and so forth, are intended to convey that the property value being described may be within a relatively small range of the property value, as those of ordinary skill would understand. For example, when a property value is described as being "approximately" equal to (or, for example, "substantially similar" to) a given value, this is intended to convey that the property value may be within +/−5%, within +/−4%, within +/−3%, within +/−2%, within +/−1%, or even closer, of the given value. Similarly, when a given feature is described as being "substantially parallel" to another feature, "generally perpendicular" to another feature, and so forth, this is intended to convey that the given feature is within +/−5%, within +/−4%, within +/−3%, within +/−2%, within +/−1%, or even closer, to having the described nature, such as being parallel to another feature, being perpendicular to another feature, and so forth. Mathematical terms, such as parallel and perpendicular, should not be rigidly interpreted in a mathematical sense, but should instead be interpreted as one of ordinary skill in the art would interpret such terms. For example, one of ordinary skill in the art would understand that two lines that are substantially parallel to each other are parallel to a substantial degree, but may have minor deviation from exactly parallel.

As briefly discussed above, a heating, ventilation, and/or air conditioning (HVAC) system may be used to thermally regulate a space within a building, home, or other suitable structure. For example, the HVAC system may include a vapor compression system that transfers thermal energy between a working fluid, such as a refrigerant, and a fluid to be conditioned, such as air. The vapor compression system typically includes heat exchangers, such as a condenser and an evaporator, which are fluidly coupled to one another via one or more conduits of a refrigerant loop or circuit. A compressor may be used to circulate the refrigerant through the conduits and other components of the refrigerant circuit (e.g., an expansion device) and, thus, enables the transfer of thermal energy between components of the refrigerant circuit (e.g., between the condenser and the evaporator) and one or more thermal loads (e.g., an environmental air flow, a supply air flow). Additionally or alternatively, the HVAC system may include a heat pump having a first heat exchanger (e.g., a heating and/or cooling coil), a second heat exchanger (e.g., a heating and/or cooling coil), and a pump (e.g., compressor) configured to circulate the working fluid (e.g., water, brine, refrigerant) between the first and second heat exchangers to enable heat transfer between the thermal loads and an ambient environment (e.g., the atmosphere), for example. Further, in some embodiments the HVAC system may include a furnace system configured to provide heating. For example, the furnace system may include a plurality of heat pipes configured to receive combustion products from a burner assembly and/or may include an electric heating coil configured to facilitate transfer of thermal energy to an air flow directed across the heat pipes and/or electric heating coil.

Generally, the HVAC system includes a blower (e.g., a fan) that is configured to direct air across heat exchange components of the HVAC system and/or along an air distribution system (e.g., ductwork) of the HVAC system. It is now recognized that traditional blowers can be inefficient in that they do not efficiently generate or direct airflow due to positioning and geometry of housing features. Further, traditional blowers are often difficult to access despite frequently requiring removal from an enclosure (e.g., a furnace enclosure, a duct, etc.) of the HVAC system, which may be arduous and time consuming. For example, traditional blowers may be coupled to an enclosure or other support structure of the HVAC system using a plurality of fasteners (e.g., screws) that are located in areas or regions of the enclosure that may be difficult or infeasible for a service technician to access without first removing and/or disassembling other components of the HVAC system that may be positioned adjacent to the blower. Moreover, removal of conventional blowers may involve cumbersome removal of control circuitry and wiring associated with the blower to provide sufficient space for subsequent extraction of the blower from the enclosure that houses the blower. This may involve decoupling and recoupling of wiring, which may be difficult to access and which may become entangled within the blower, including engaging with blower fan blades. As such, it is now recognized that traditional blower arrangements can create maintenance (e.g., installation, removal, repair, cleaning) difficulties.

It is now recognized that blower operation may be improved by providing blower housing features with certain geometric characteristics and by positioning said features in a manner that improves air flow optimization (e.g., in orientations that allow for airflow direction over desired locations). Further, it is now recognized that maintenance, installation, removal, and other operations on the blower may be facilitated and improved by enabling removal and/or replacement of the blower without disassembly and/or removal of other HVAC system components that may be adjacent to the blower. This includes facilitating access to and stabilized positioning of electrical connections between the blower (e.g., the blower motor) and other electronic components (e.g., a power supply, control board). Facilitating maintenance, installation, removal, and other operations on the blower may reduce a time period between non-operational periods of the HVAC system (e.g., such as while maintenance is performed on the blower), which may improve an overall efficiency of the HVAC system and/or may reduce costs associated with HVAC system maintenance.

Accordingly, embodiments of the present disclosure are directed toward a blower assembly with housing features that encourage airflow efficiencies and that is configured to facilitate electrical connection of the blower to a controller, power supply or the like. The blower assembly in accordance with present embodiments also facilitates removal and/or extraction of the blower assembly from an enclosure (e.g., a blower enclosure) of the HVAC system. The blower assembly includes a support member or a shelf (also referred to a blower shelf) that may be coupled to or otherwise positioned within a blower enclosure of the HVAC system, such as an enclosure of a furnace or air handling unit, for example. The blower shelf may include one or more guide brackets extending therefrom or coupled thereto. The guide brackets may facilitate engagement with respective flanges of a surface of the blower. Specifically, first and second support channels or ledges adjacent outer flange guides may be configured to receive or guide respective flanges of a housing (e.g., a blower housing) of the blower. Such engagement between the blower shelf and the blower housing may enable translation of the blower along the blower shelf in a first direction toward an installed configuration and, alternatively, to translate along a second direction (e.g., opposite to the first direction) toward an uninstalled configuration. That is, the blower assembly may facilitate rapid transitioning of the blower between the installed configuration (e.g., an installed configuration within the blower enclosure) and the uninstalled configuration (e.g., an unassembled, removed, or extracted configuration of the blower with respect to the blower enclosure) via translation of the blower along the blower shelf and without involving disassembly of other HVAC components that may be positioned adjacent to the blower in the blower enclosure. Moreover, as discussed below, control circuitry of the blower may be coupled to the blower housing and connective wiring may be guided into connection with the blower via a guide bracket that functions as a blower motor support and a barrier that blocks the wiring from extending into blower internals (e.g., into engagement with a rotating blower fan). This guide bracket may also facilitate translation of the blower between the installed and uninstalled configurations while electrically connected (e.g., via the wiring to a controller, power source, or the like) by limiting potential for the wiring to enter the blower internals during such translation. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12 incorporating a blower system in accordance with present embodiments. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers, fans, and/or blowers, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
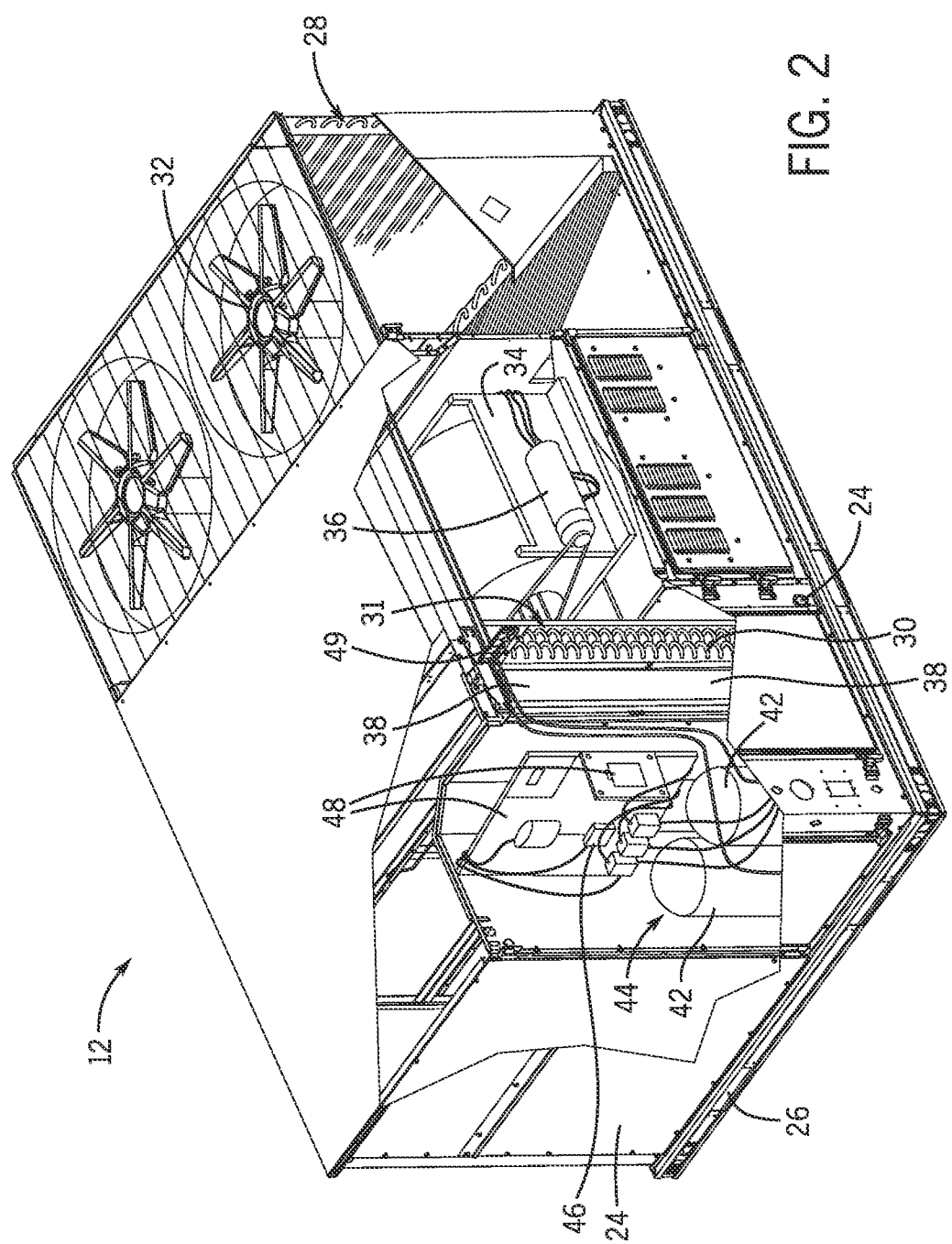
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10.

While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, including components in accordance with present embodiments and powered by a motor 36 (wherein the motor 36 may be considered part of the blower assembly 34), is operable to draw air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12. Further, the wiring 49 may connect to the blower assembly 34 (e.g., via the motor 36) to facilitate provision of power and control (e.g., operational instructions).

Figure 3:
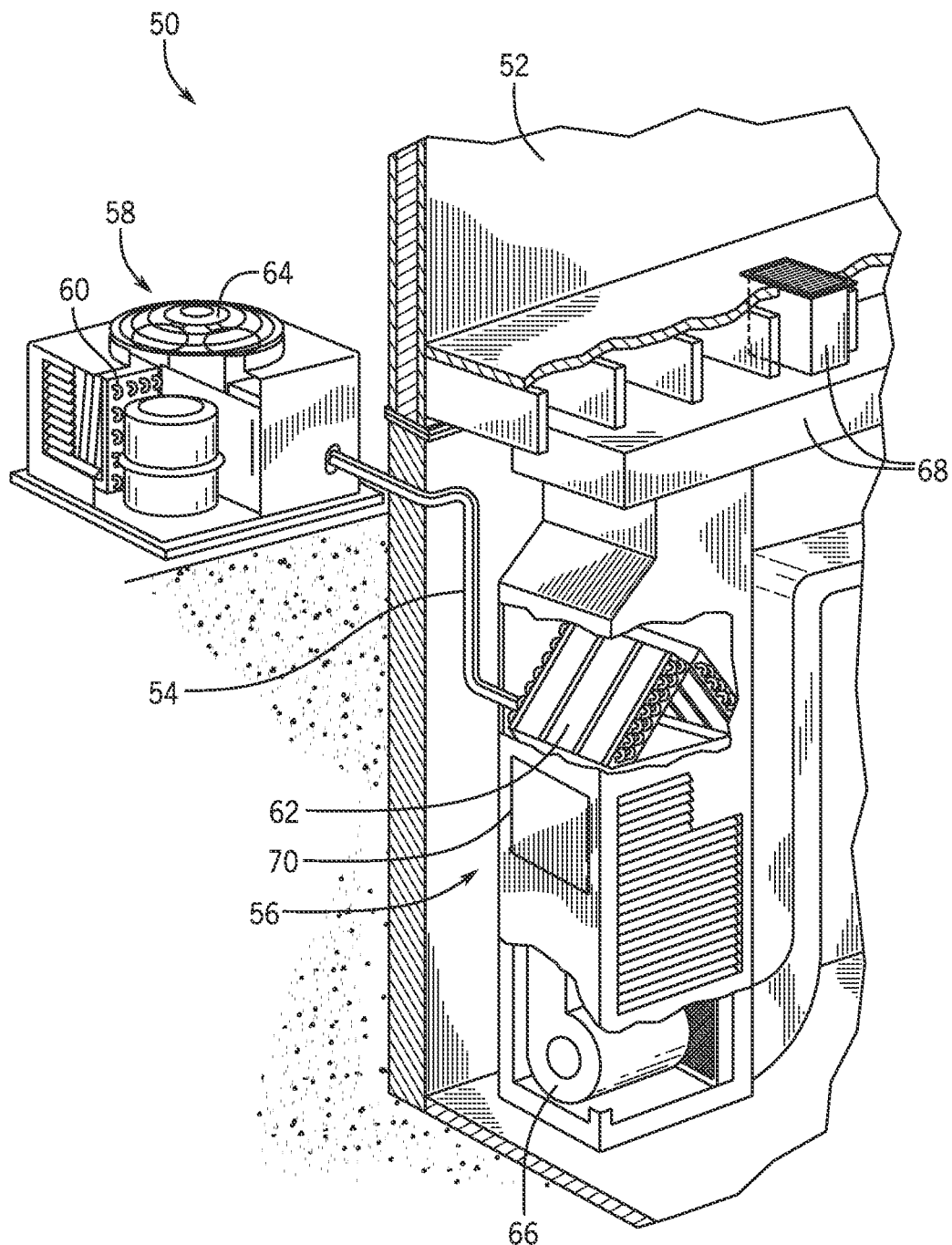
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. The blower or fan 66 includes features in accordance with present embodiments that facilitate operation and maintenance. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
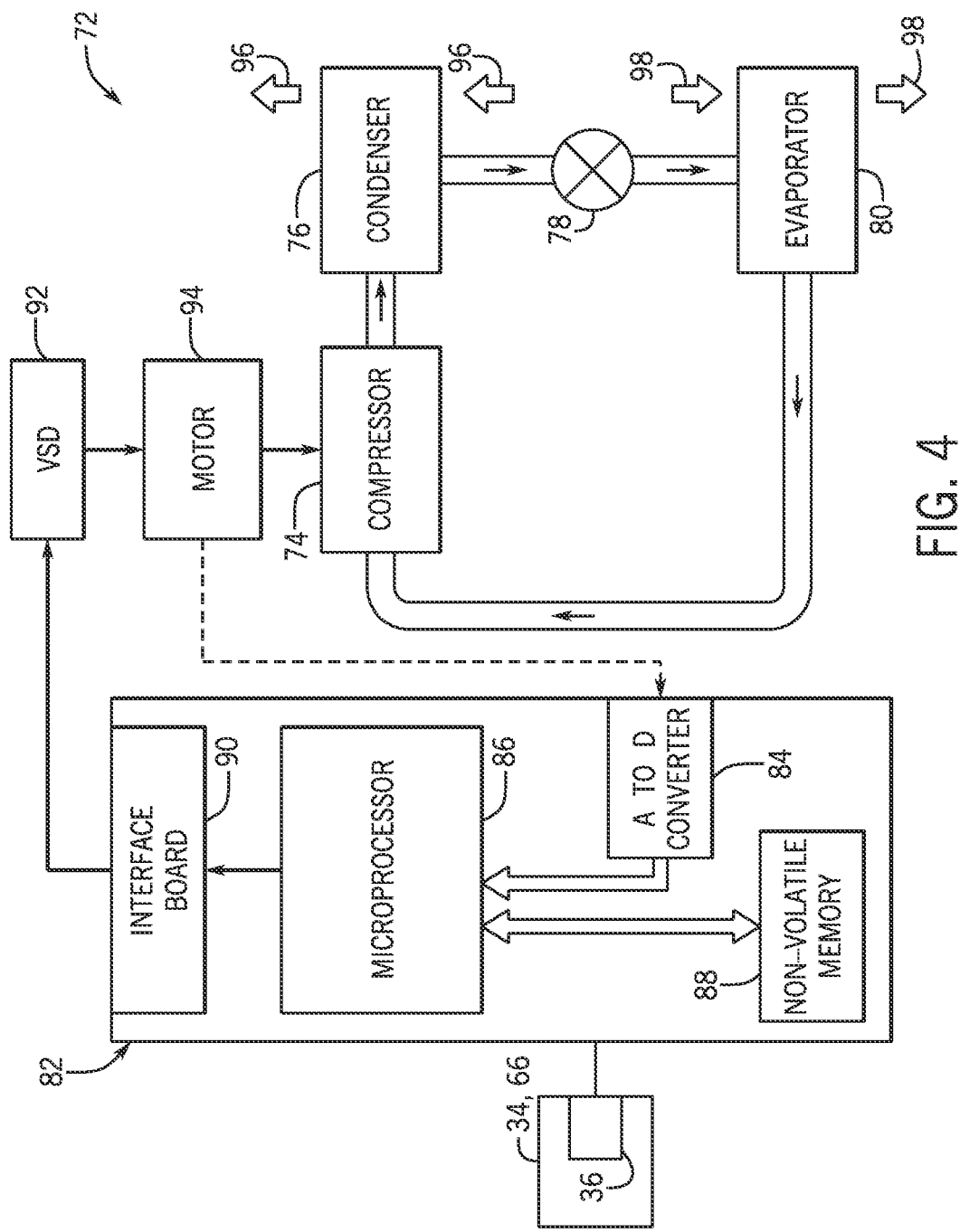
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72, including the blower assembly 34, 66 (including the blower motor 36), based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
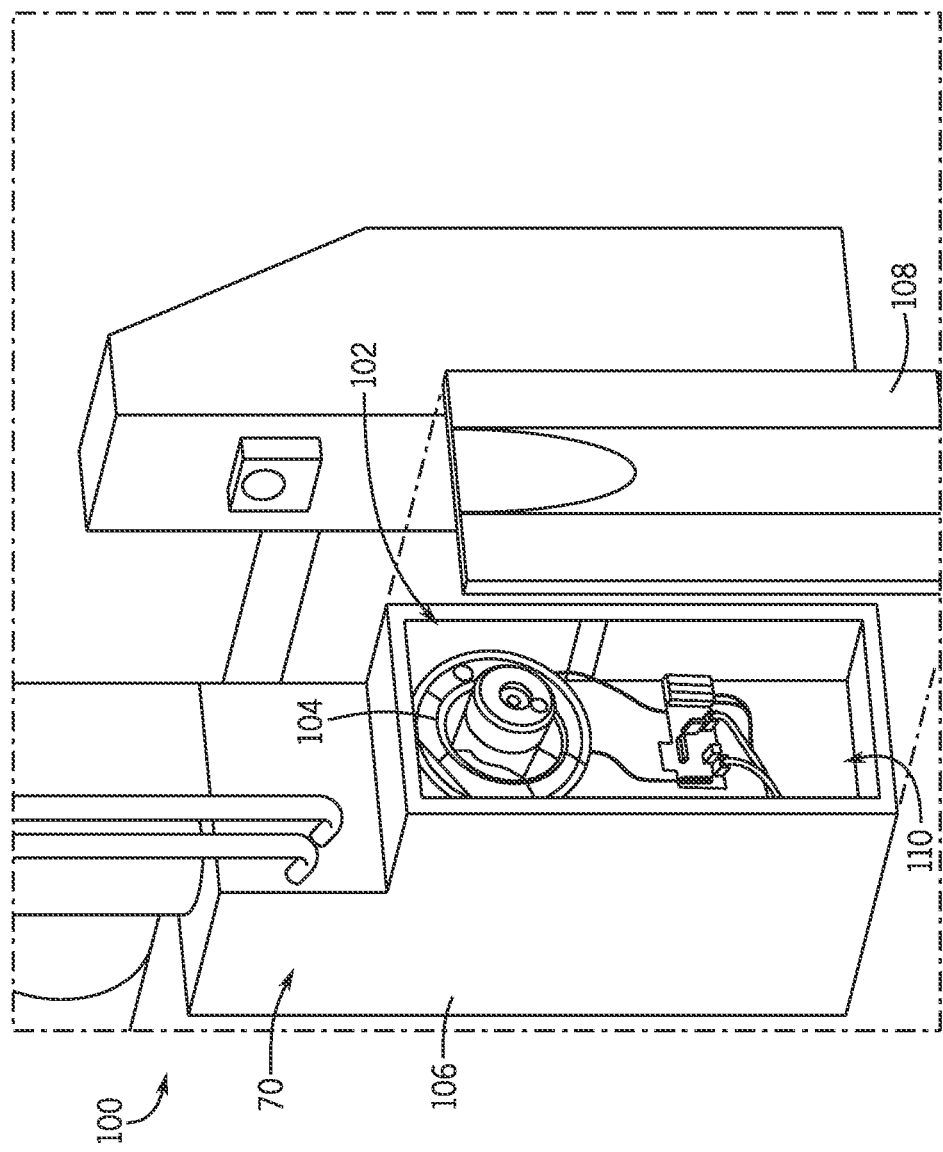
FIG. 5 is a perspective view of an embodiment of a portion of an HVAC system having a blower assembly, in accordance with an aspect of the present disclosure.

FIG. 5 is a perspective view of an embodiment of a portion of an HVAC system 100 that includes the furnace system 70. The furnace system 70 includes a blower assembly 102 in accordance with present embodiments. The blower assembly 102 includes a blower 104, such as the blower 66, which may be configured to direct air across heat exchanger components (e.g., heat transfer tubes) of the furnace system and through ductwork (e.g., the ductwork 68) of a building or other structure serviced by the HVAC system 100. In the illustrated embodiment, the furnace system includes an enclosure 106 (e.g., an air handler enclosure) configured to house components of the furnace system 70, such as the blower 104 and the heat transfer tubes of the furnace system 70. For clarity, the enclosure 106 may also be referred to herein as a "blower enclosure." The enclosure 106 may include a door 108 or panel that may be moveably (e.g., pivotably, removably, slidingly) coupled to a remainder of the enclosure 106 to expose or occlude an opening 110 of the enclosure 106. As discussed in detail herein, the blower assembly 102 may facilitate installation of the blower 104 into and removal of the blower 104 from the enclosure 106 via the opening 110, for example. That is, the blower assembly 102 may facilitate transitioning the blower 104 to an installed configuration or an assembled configuration within the enclosure 106 and to an uninstalled configuration or a removed configuration from the enclosure 106, substantially without involving disassembly of other HVAC components that may be positioned within the enclosure 106 and/or adjacent to the blower 104. It should be appreciated that the presently disclosed techniques may be incorporated with other systems or components including the blower assembly 102, such as an air handling unit, an indoor unit, a rooftop unit, or other HVAC system.

Figure 6:
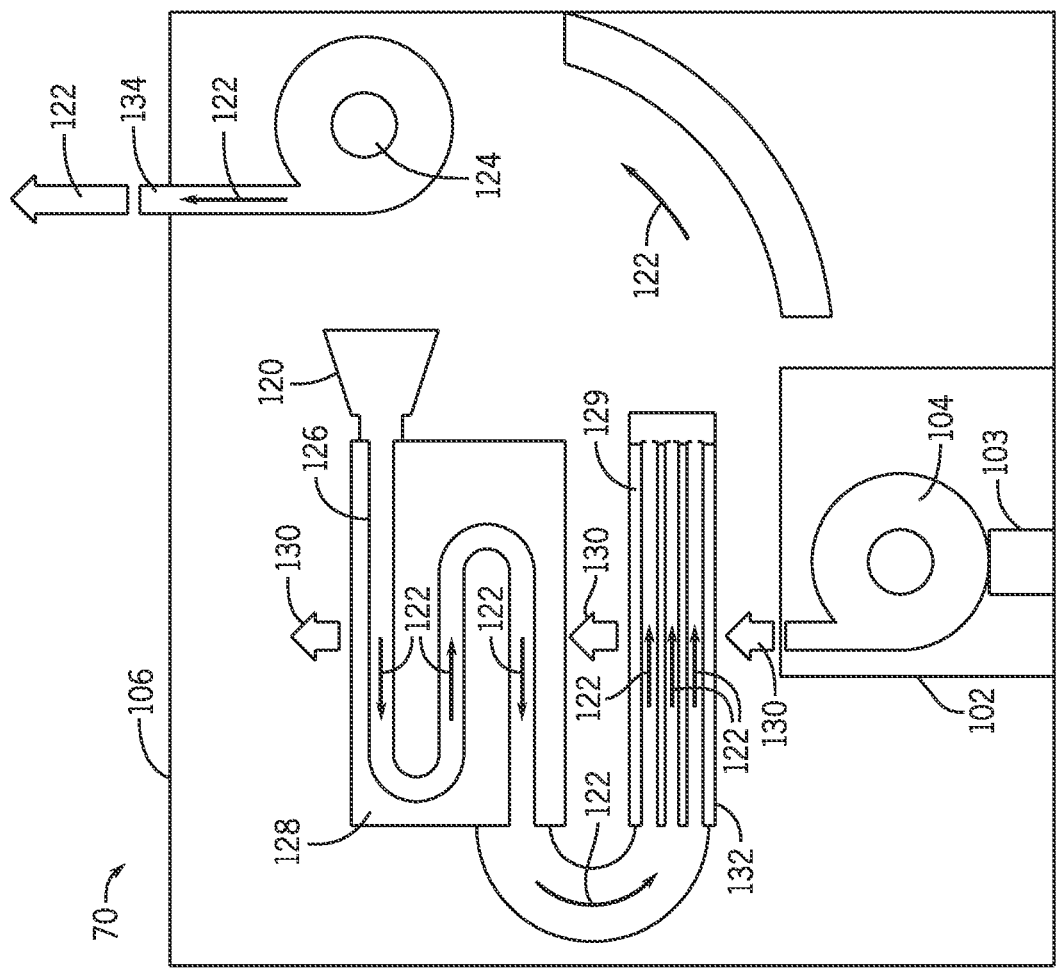
FIG. 6 is a schematic of an embodiment of a furnace system having a blower assembly, in accordance with an aspect of the present disclosure.

FIG. 6 is a schematic of an embodiment of the furnace system 70 having the blower assembly 102, which includes a guide bracket 103 that couples with the blower 104 (e.g., via the motor 36) and guides electrical wiring that communicatively couples with the blower 104. In the illustrated embodiment, the furnace system 70 includes a burner 120 (e.g., one or more burner assemblies) configured to combust a fuel to generate combustion products 122. A draft inducer blower 124 is configured to draw the combustion products 122 through one or more tubes 126 of a first heat exchanger 128 and through one or more additional tubes 129 of a second heat exchanger 132 (e.g., a condensing heat exchanger). The blower 104 is configured to direct a flow of supply air 130 across the tubes 126 of the first heat exchanger 128 and the additional tubes 129 of the second heat exchanger 132 to enable the supply air 130 to absorb thermal energy from the heated combustion products 122 directed through the first and second heat exchangers 128, 132. As such, the blower 104 may deliver heated supply air 130 to a space within a building or other structure serviced by the HVAC system 100. The draft inducer blower 124 may discharge the combustion products 122 form the furnace system 70 via an exhaust vent 134. It should be understood that, in some embodiments, the first heat exchanger 128 or the second heat exchanger 132 may be omitted from the furnace system 70. Indeed, many different embodiments of the furnace system 70 are envisioned, and the illustrated embodiment of the furnace system 70 of FIG. 6 is one or many and intended to provide general context for the following discussion. The furnace system 70 includes the blower assembly 102 configured to enable improved installation and removal of the blower 104 from the enclosure 106 of the furnace system 70 in accordance with the techniques discussed herein.

Although the blower assembly 102 is discussed in the context of implementation in the furnace system 70 throughout the following discussion, it should be appreciated that the blower assembly 102 may be implemented to facilitate installation and removal of the blower 104 or of another fan from any suitable enclosure, system, or space. That is, the blower assembly 102 may be used in accordance with the presently disclosed techniques to facilitate installation or removal of a blower, fan, or other flow generating device from a heat exchanger assembly (e.g., an evaporator assembly, a condenser assembly), a duct, a refrigeration unit, another HVAC system housing or enclosure, and so forth.

Figure 7:
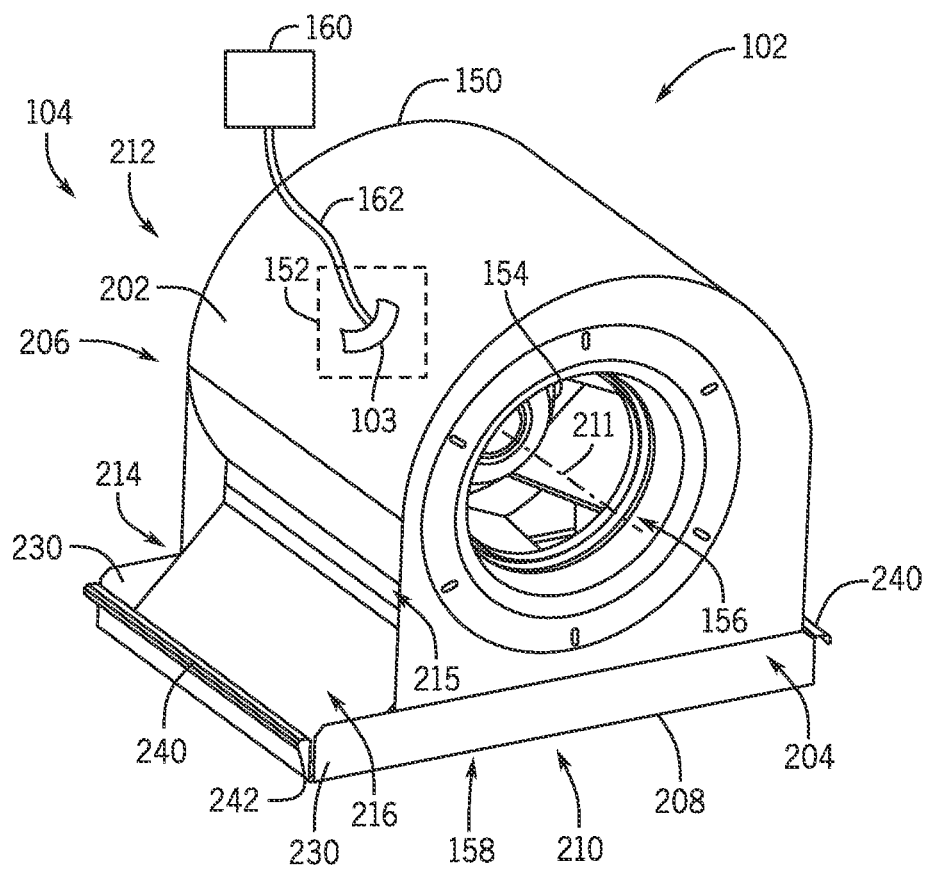
FIG. 7 is a perspective front view of a blower housing in accordance with an aspect of the present disclosure.

With the foregoing in mind, FIG. 7 is a perspective view of an embodiment of the blower assembly 102. In the illustrated embodiment of FIG. 7, the blower 104 includes a blower housing 150 and a motor 152 (e.g., a blower motor) coupled to the blower housing 150. The motor 152 is configured to drive rotation of a fan wheel 154 of the blower 104. Via rotation of the fan wheel 154, the motor 152 may cause the blower 104 to intake an air flow via an inlet 156 of the blower housing 150 and discharge the air flow via an outlet port 158 of the blower housing 150 positioned underneath the blower housing 150, in the illustrated embodiment. The inlet 156 is positioned proximate an air intake area of the fan wheel 154.

In the illustrated embodiment, the blower assembly 102 includes or is coupled with a controller 160, which is representative of any of various communicatively connected features (e.g., one or more processors, control boards, power supplies, and/or the like). The controller 160 may include control circuitry of the blower 104, which may be electrically and/or communicatively coupled to the motor 152 via wiring 162. The controller 160 may be configured to control or otherwise adjust operation of the blower 104 (e.g., instruct the motor 152 to increase or decrease in speed). The wiring 162 may be guided into coupling with electrical connectors via the guide bracket 103, which may also block the wiring 162 from extending into an interior portion of the blower 104, which could cause operational and maintenance issues. As discussed below, connective portions of the wiring 162 may be configured to move (e.g., translate) with the blower housing 150 (e.g., relative to an enclosure or a blower shelf), during transition of the blower 104 from an installed configuration to an uninstalled configuration, and vice versa. The guide bracket 103 facilitates this functionality by retaining a portion of the wiring 162 within a desired positional range.

The blower housing 150 is a hollow structure that accommodates the fan wheel 154 therein, wherein the fan wheel 154 may be any suitable fan for HVAC applications (e.g., a plenum fan, such as a direct-drive plenum fan (DDPF)). The blower housing 150 may be formed by a curved boundary 202 (also referred to herein as a curved wall 202, curved side 202, or a profile surface 202) extending between a front boundary 204 (also referred to herein as a front wall 204, front side 204, or front surface 204) and a rear boundary 206 (also referred to herein as a rear wall 206, rear side 206, rear surface 202). The curved boundary 202 may have a profile with an involute shape, a substantially circular shape, a semi-circular shape, an angular shape, or other suitable shape. For example, the curved boundary 202 may include a profile with curves, angles (e.g., angles that cumulative form a curve), and combinations thereof. The curved boundary or profile surface 202 forms what may be considered a top side of the blower housing 150. The blower housing 150 may also have what may be considered a base 208 coupled to the curved boundary 202. The base 208 includes a bottom side 210, which may include the outlet port 158 for expelling airflow. It should be understood that the terms "base", "front", "rear", "top" and "bottom" are merely used to facilitate discussion. For example, these terms are not intended to suggest a specific required orientation relative to gravity or a required orientation with respect to an access port or the like. Indeed, an exterior of the profile surface 202 may be considered an outward facing surface and the bottom side 210 may be considered an inwardly facing surface since it will generally face an airflow passage in operation.

As can be generally observed in the perspective view of the blower assembly 102 in FIG. 7, a cross-sectional profile of the blower housing 150 taken along a rotational axis 211 of the fan wheel 154 has an involute shape. This involute shape may be formed by an involute section 212 of the profile surface 202. In other words, the cross-sectional profile of the profile surface 202 includes a cross-sectional profile of the involute section 212 having a spiraling curved shape wherein a radius extending perpendicularly from the axis of the fan wheel 154 to the outer edge of the blower housing 150 grows gradually smaller from one side of the blower housing 150 to the other. The cross-sectional profile of the profile surface 202 also includes a footing 214 that extends from the smallest radius of the involute section 212 (or an area proximate the smallest radius of the involute section 212) to the base 208. In the illustrated embodiment, the footing 214 includes a first section 215 and a second section 216. The first section 215 (which may be referred to as a vertical section 215), extends from the involute section 212 to the second section 216 (which may be referred to as a sloped section 216). The sloped section 216 then extends to the base 208. The first section 215 may be described as vertical because, in the illustrated embodiment it extends, generally vertically (much like the front side 204 and rear side 206 extend vertically from the base 208) which extends to the base 208. The second section 216 slopes away from the profile surface 202, which also facilitates directing airflow out of the blower 104, as will be discussed further below. In other embodiments, the footing 214 may be curved, include multiple bevels, or incorporate other geometric aspects that facilitate achievement of the desired purpose (e.g., connecting the involute section 212 to the base while providing guidance and room for airflow generated by the blower 104).

The blower housing 150 illustrated in FIG. 7 also includes holding members 230 (e.g., flanges) extending from the base 208. These holding members 230 may attach to or extend adjacent the front boundary 204 and the rear boundary 206. The holding members 230 may function to provide support (e.g., structural reinforcement) to the blower housing 150 and/or function as guides for engagement with features of the blower shelf, as will be discussed in further detail below. The blower housing 150 also has handles 240 extending from the base 208. The widths of the handles 240 and the holding members 230 may be substantially orthogonal to one another, as in the illustrated embodiment. The handles 240 may incorporate bends and corresponding transverse planar portions 242 to create a cross-sectional hook shape that facilitates gripping (e.g., a hand grip by a maintenance person) to better enable movement of the blower housing 150. Further, the handles 240 and the holding members 230 may be formed by bending flaps (e.g., of a sheet metal piece) initially extending in a planar orientation from of the base 208 (e.g., upwardly) into transverse panels, flanges, or walls.

Figure 8:
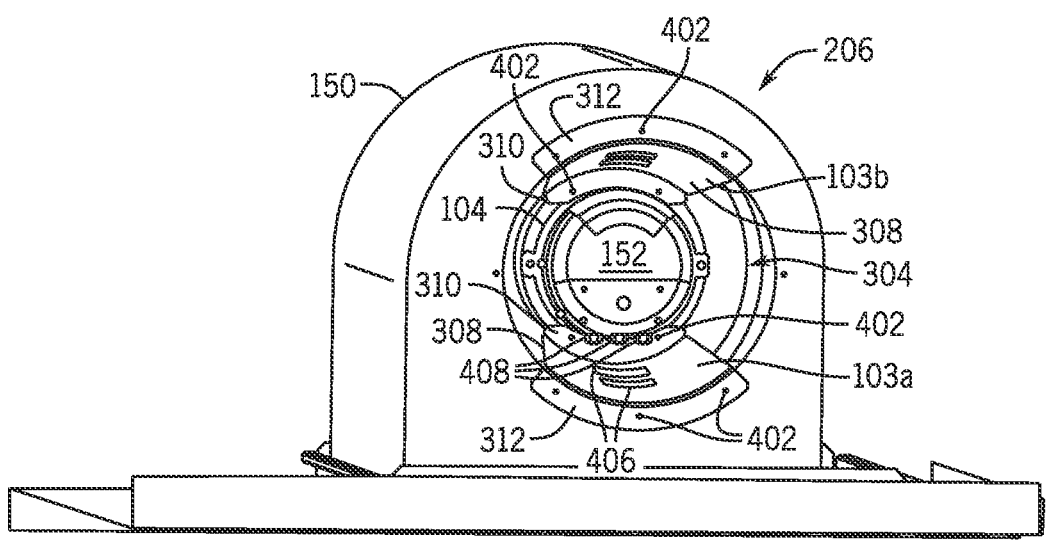
FIG. 8 is a perspective rear view of the blower housing of FIG. 7 in accordance with an aspect of the present disclosure.

FIG. 8 is a perspective view of the rear side 206 of the blower housing 150, wherein a guide bracket 103a and an additional guide bracket 103b are coupled (e.g., via fasteners, welds, press fittings, screws, or the like) to both the blower housing 150 and the blower 104. More specifically, in the illustrated embodiment, the guide brackets 103a, 103b are coupled to the rear boundary 206 (e.g., sheet metal) and extend through an opening or access port 304 through the rear side 206 into engagement with the motor 152 of the blower 104, which is disposed inside the blower housing 150.

For ease of reference, the guide brackets 103a, 103b may generally be described with reference to the singular guide bracket 103 since, in the illustrated embodiment, the guide brackets 103, 103b are essentially identical. In the illustrated embodiment, the guide bracket 103 is contoured in a curved manner to compliment the shape of the perimeter of the opening or access port 304. Specifically, in the illustrated embodiment, the guide bracket 103 includes a middle portion 308 that extends between an inner flange 310 and an outer flange 312. The guide bracket 103 may be formed (e.g., molded) as a single piece of material (e.g., plastic) or formed (e.g., stamped) from a single piece of material (e.g., a piece of sheet metal). In the illustrated embodiment, the middle portion 308 is generally shaped like a section of a frustum of a cone, wherein the inner flange 310 extends from the narrow end of the frustum section and the outer flange 312 extends from the wider end of the frustum section. In other embodiments, the guide bracket 103 may be more cylindrical, prismatic, cubical, or the like. Further, the guide bracket 103 may be complimentary (e.g., tracing the opening perimeter) or offset (e.g., cutting across the opening perimeter) relative to the opening or access port 304.

As noted above, the guide bracket 103 includes the inner flange 310 and the outer flange 312, which are used for coupling. The outer flange 312 includes coupling features 402 (e.g., weld points, fastener receptacles) that facilitate coupling of the guide bracket 103 to the blower housing 150. The inner flange 310 includes coupling features 402 (e.g., weld points, fastener receptacles) that facilitate coupling with the blower 104 (e.g., the motor 152). Via such couplings, the guide bracket 103 operates to support the blower 104 within the blower housing 150. The blower 104 may be considered to be cantilevered within the blower housing 150 by the guide bracket 103, with the primary support coming from the coupling of the outer flange 312 to the blower housing 150. The extension of the cantilever is provided by the middle portion 308. The length of the middle portion 308 (e.g., the distance extending between the inner flange 310 and the outer flange 312) corresponds to a depth of the opening or access port 304, geometry of the blower 104, and desired positioning and/or orientation of the blower 104 within the blower housing 150. In some embodiments, the blower 104 is mounted within the blower housing 150 such that the center of the fan wheel 154 is concentric with a center of at least the inlet 156 or the access port 304. In some embodiments, the center of the fan wheel 154 is eccentric with respect the center of the inlet 156 and/or access port 304. In the illustrated embodiment, the middle portion 308 is depicted as including slots (e.g., openings for ventilation or reduced weight) or indentations (e.g., deformed or raised portions for additional structural support) 406.

As shown in FIG. 8, the guide bracket 103a is aligned with electrical connectors 408 of the blower 104. In particular, the inner flange 310 of the guide bracket 103 extends under the connectors 408 so that the connectors 408 are positioned over the middle portion 308 of the guide bracket 103a. In some embodiments, the inner flange 310 may include grooves configured to fit around the connectors 408 to further facilitate this arrangement. When the connectors 408 are coupled with wiring (e.g., to provide power, control signals, and/or the like) this arrangement facilitates blocking the wires from entering (e.g., folding or bending) into interior portions of the blower 104 and facilitates guidance of the wires along the outward facing surface of the guide bracket 103a. Indeed, when wiring is connected to the connectors 408, the wiring will extend out along the outwardly facing surface of the middle portion 308. Further, upon movement of the blower housing 150 relative to the wiring, while the wiring may flex, the guide bracket 103a (and the guide bracket 103b) will block it from entering interior portions of the blower 104, where damage or interference could occur.

Figure 9:
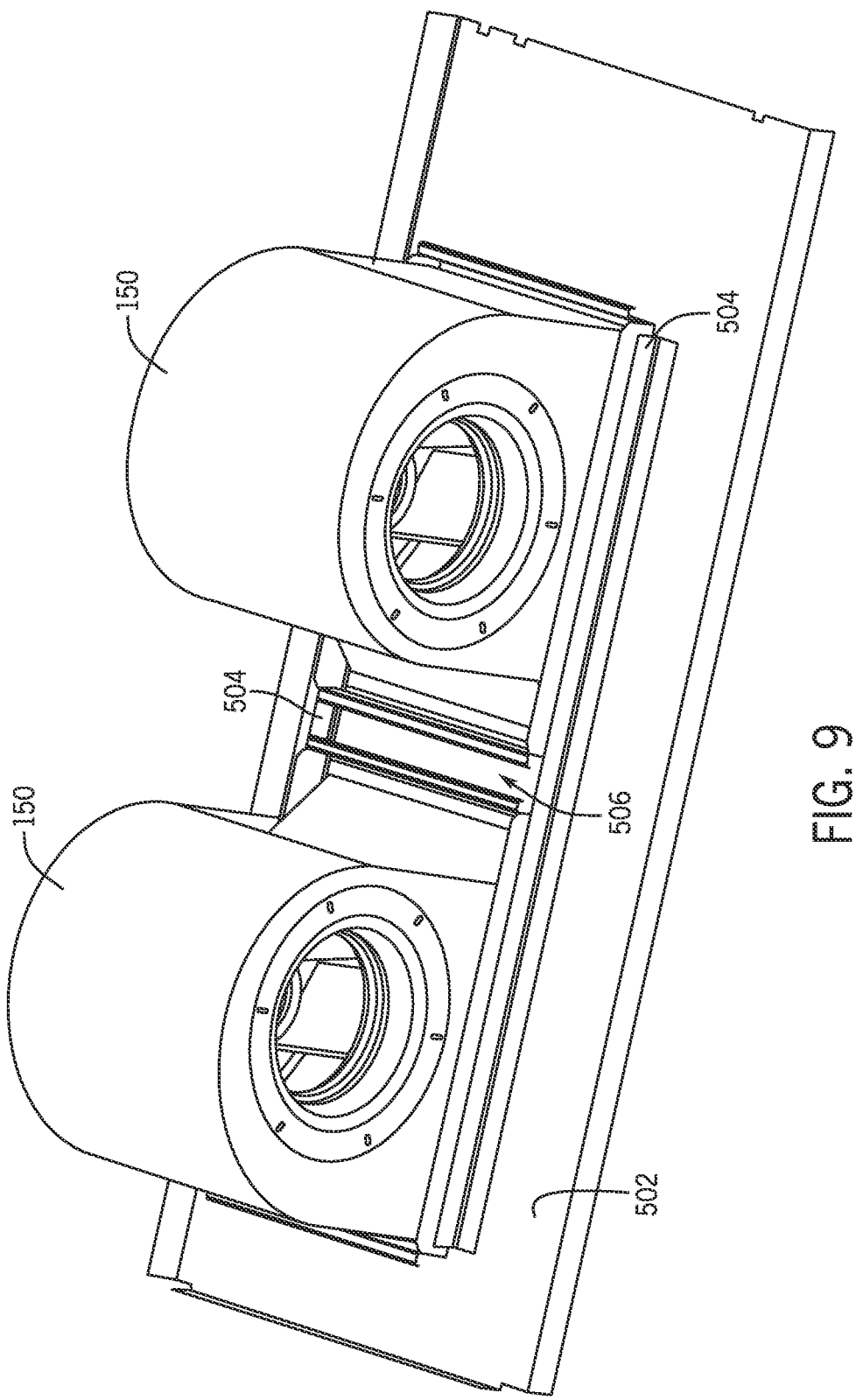
FIG. 9 is an overhead perspective view of two blower housings coupled to a blower shelf, in accordance with an aspect of the present disclosure.

FIG. 9 is a perspective view of two blower housings 150 coupled to a blower shelf 502. While FIG. 9 depicts two blower housings 150, any number of blower housings 150 (including a single blower housing 150) may be coupled to the blower shelf 502, which may be configured for the desired number of such couplings. The blower shelf 502 may include one or more guiding members 504 to facilitate alignment and attachment of the blower housing 150 to the blower shelf 502. In the illustrated embodiment, two guiding members 504 are provided proximate to opposite sides of a slot 506 on the blower shelf 502. The slot 506 is positioned such that it coincides with the outlet port 158 provided on the bottom of the blower housing 150. This allows the airflow to move out of the blower housing 150 and through the slot 506. A number of the slots 506 in the blower shelf 502 may correspond to the number of blower housings 150 it is configured to couple with.

Figure 10:
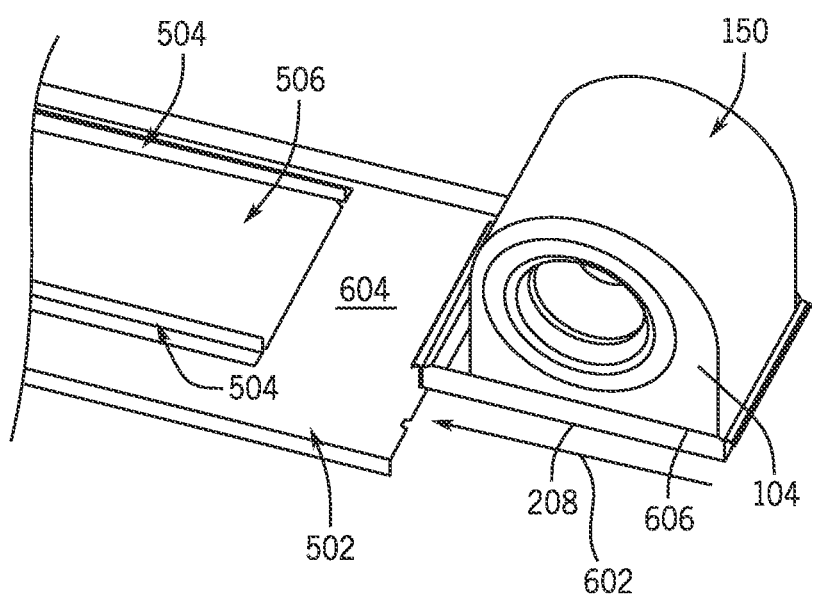
FIG. 10 is a perspective view of the blower housing of FIG. 7 sliding into engagement with the blower shelf, in accordance with an aspect of the present disclosure.

FIG. 10 illustrates the blower housing 150 (including the blower 104) in the process of sliding into engagement with the blower shelf 502, as represented by arrow 602. The blower housing 150 is configured to engage with and translate along a main surface 604 of the blower shelf 502 to facilitate transition of the blower 104 between an installed configuration on the blower shelf 502 and an uninstalled configuration disconnected from the blower shelf 502. Once the blower housing 150 is slidingly engaged with the blower shelf 502 in the installed configuration, the blower shelf 502 may be configured to fixedly couple (e.g., via fasteners) to a portion of the blower housing 150. In the illustrated embodiment, the blower shelf 502 includes the main surface 604, also referred to herein as a sliding surface or main panel, and the guiding members 504 (e.g., flanges or rails) that extend from a perimeter of the slot 506 in main surface 604. In addition to guiding engagement, in some embodiments, the guiding members 504 may facilitate coupling the blower shelf 502 to a suitable portion of the blower housing 150 and/or add structural rigidity and/or stiffness to the blower shelf 502.

The blower housing 150 may include complementary guiding members 606 that cooperate with the guiding members 504. The complementary guiding members 606 may be in the form of rails or tabs extending from sides of the base 208. The complementary guiding members 606 may include the holding members 230 and/or extensions (e.g., a U-shaped bends extending opposite the holding members 230). The complementary guiding members 606 may extend into grooves formed by the guiding members 504 and or the slot 506 to facilitate engagement. Further, in some embodiments, the complementary guiding members 606 may be slots that receive the guiding members 504 to facilitate coupling between the blower housing 150 and the blower shelf 502.

Figure 11:
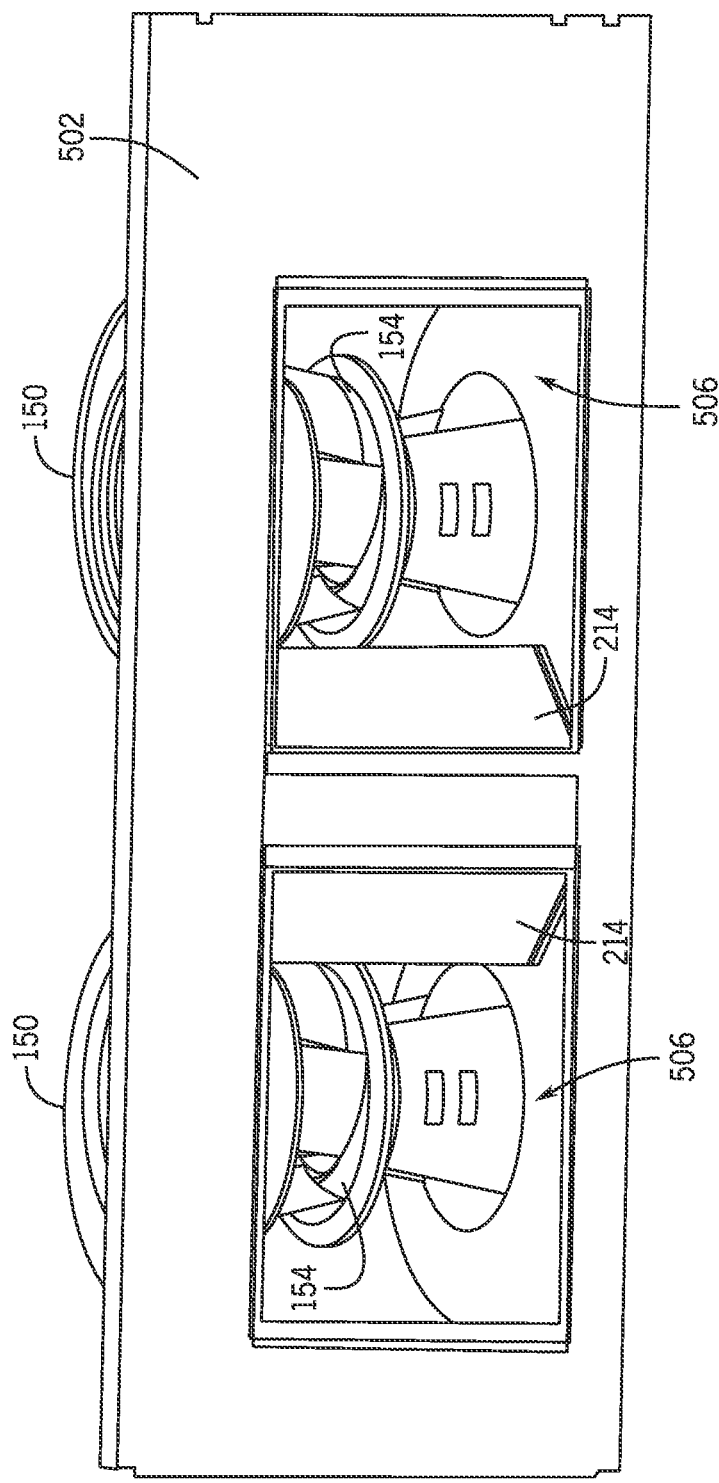
FIG. 11 is a bottom perspective view of the two blower housings coupled to the blower shelf of FIG. 9, in accordance with an aspect of the present disclosure.

FIG. 11 is a bottom perspective view of two blower housings 150 coupled to the blower shelf 502, in accordance with an embodiment of the present disclosure. Internal components (e.g., the fan wheel 154) of the blower 104 and the blower housing 150 (e.g., an inner side or surface of the footing 214) are observable through the slots 506 in the illustrated embodiment. In the illustrated embodiment, it should be noted that the footings 214 for each blower housing 150 are positioned in opposite configurations and adjacent one another. In other embodiments, different arrangements may be employed to direct airflow in a desired manner. The sloped nature of the footings 214 operate to guide airflow exiting the blower 104 (e.g., guide it away from the axis of rotation of the fan wheel 154) and to create additional space (e.g., more volume within the housing 150) for provision of a low pressure side of the blower 104. These footings 214 can be repositioned relative to one another or relative to other system components to guide the airflow over components (e.g., heat exchangers) in a manner that improves operational efficiencies of a corresponding HVAC system. It should be emphasized that any of a variety of orientations of the blowers 104 and blower housing 150 may be employed. For example, while the blowers 104 are positioned in parallel (with respect to an axis of fan wheel rotation) in the illustrated embodiment, in other embodiments the blowers 104 may be positioned in series or at angles relative to one another.

As set forth above, embodiments of the present disclosure may provide one or more technical effects useful for facilitating installation, removal, maintenance, inspection, and/or replacement of a blower disposed within an enclosure without disassembly and/or removal of other HVAC system components adjacent to the blower. Moreover, the blower assembly disclosed herein enables removal of control circuitry of the blower together with a housing of the blower, without involving separate removal of the control circuitry independent of the housing, which may expedite and reduce a complexity of removal of the blower and the control circuitry from the HVAC system. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and/or air conditioning (HVAC) blower assembly, comprising:
    a fan including a motor and a fan wheel, wherein the motor is configured to drive rotation of the fan wheel about an axis of rotation;
    a blower housing configured to accommodate the fan wheel within a hollow portion of the blower housing, the blower housing defined by a base, a curved boundary, a front boundary, and a rear boundary;
    an inlet port extending through the front boundary and configured to facilitate intake of airflow into the fan wheel;
    an outlet port extending through the base and configured to facilitate expulsion of the airflow from the fan wheel; and
    a first portion of the curved boundary comprising an involute profile and a second portion of the curved boundary comprising a footing extending from the first portion to the base such that airflow exiting through the outlet port is guided away from the fan wheel by an interior-facing surface of the footing, wherein the footing comprises a vertical section coupled to the first portion and a sloped section coupling the vertical section to the base.

2. The HVAC blower assembly of claim 1, wherein the footing extends from a smallest radius of the first portion to the base.

3. The HVAC blower assembly of claim 1, comprising a blower shelf configured to slide into engagement with holding members extending from the base such that a slot in the blower shelf aligns with the outlet port, wherein the holding members comprise complementary guiding members that extend from sides of the base and are configured to receive guiding members of the blower shelf.

4. The HVAC blower assembly of claim 1, comprising an access port in the rear boundary configured to receive the fan into the hollow portion.

5. The HVAC blower assembly of claim 4, comprising a guide bracket configured to couple with the rear boundary and the motor to support the fan within the hollow portion.

6. The HVAC blower assembly of claim 5, wherein the guide bracket comprises a first flange configured to couple with the rear boundary, a second flange configured to couple with the motor, and a middle portion coupling the first flange to the second flange.

7. The HVAC blower assembly of claim 6, comprising wiring connectors coupled to the motor, wherein the second flange is configured to slide between the motor and wiring connectors such that wiring coupled to the wiring connectors extends over the middle portion.

8. The HVAC blower assembly of claim 6, wherein the middle sections comprises a section of a frustum of a cone.

9. The HVAC blower assembly of claim 1, comprising:
    an access port in the rear boundary configured to receive the fan into the hollow portion; and
    a pair of guide brackets comprising first flanges configured to couple with the rear boundary, second flanges configured to couple with the motor, and middle portions respectively extending between the first and second flanges such that the fan is retained within the hollow portion.

10. The HVAC blower assembly of claim 9, wherein the first flanges and the second flanges are contoured to follow a perimeter of the of the access port.

11. The HVAC blower assembly of claim 9, comprising:
    electrical connectors extending from the motor and over one of the first flanges such that the one of the first flanges is positioned between the electrical connectors and the motor;
    an electronic component; and
    wiring coupling the electronic component to the motor via the electrical connectors, wherein the wiring extends over one of the middle portions corresponding to the one of the first flanges.

12. The HVAC blower assembly of claim 1, wherein the footing extends from a position along the involute profile that is closest to the axis of rotation.

13. The HVAC blower assembly of claim 1, comprising a guide bracket coupled with the rear boundary via a first flange of the guide bracket and coupled to the motor via a second flange of the guide bracket, wherein the first flange and the second flange coupled together via a middle portion and the guide bracket is formed from a single piece of stamped sheet metal.

14. The HVAC blower assembly of claim 13, wherein the guide bracket alone or in conjunction with another guide bracket cantilever the fan in the hollow portion.

15. A heating, ventilation, and/or air conditioning (HVAC) blower assembly, comprising:
    a fan including a motor and a fan wheel, wherein the motor is configured to receive electricity via electrical connectors and to drive rotation of the fan wheel about an axis of rotation;
    a blower housing configured to accommodate the fan wheel within a hollow portion of the blower housing, the blower housing defined by a base, a curved boundary, a front boundary, and a rear boundary;
    an inlet port extending through the front boundary and configured to facilitate intake of airflow into the fan wheel;
    an outlet port extending through the base and configured to facilitate expulsion of the airflow from the fan wheel;
    an access port in the rear boundary configured to receive the fan into the hollow portion; and
    a guide bracket comprising a middle portion extending between a first flange and a second flange, wherein the guide bracket is configured to couple with the rear boundary of the blower housing via the first flange and couple to the motor via the second flange such that the fan is held by the guide bracket within the hollow portion and wiring coupled to the electrical connectors extends along the middle portion and is blocked from contacting the fan wheel.

16. The HVAC blower assembly of claim 15, wherein the first flange is contoured to follow a perimeter of the of the access port.

17. The HVAC blower assembly of claim 15, wherein the middle portion comprises a segment of a frustum of a cone.

18. The HVAC blower assembly of claim 15, comprising a first portion of the curved boundary including an involute profile.

19. The HVAC blower assembly of claim 18, comprising a second portion of the curved boundary including a footing extending from the first portion to the base such that airflow exiting through the outlet port is guided away from the fan wheel by an interior-facing surface of the footing.

20. A method of supporting a fan within a blower housing, comprising:
- coupling with a rear boundary of a blower housing via a first flange of a guide bracket, wherein the first flange is coupled to a second flange of the guide bracket via a middle portion of the guide bracket that is in the form of a segment of a frustum of a cone, wherein the guide bracket is formed from a single piece of stamped sheet metal;
- coupling with a motor of a fan via the second flange such that the middle portion extends into an access port of the blower housing and the fan is held within a hollow portion of the blower housing by the guide bracket;
- guiding wiring along the middle portion, wherein the wiring is coupled to electrical connectors of the motor; and
- blocking, via the guide bracket, the wiring from contacting the fan wheel.

* * * * *